PREPAID ENTERTAINMENT DISTRIBUTION SYSTEM

Filed Aug. 20, 1962 3 Sheets-Sheet 1

INVENTOR.
FROST L. TINKLEPAUGH
BY
Carl Miller
ATTORNEY

INVENTOR.
FROST L. TINKLEPAUGH
BY
Carl Miller
ATTORNEY

PREPAID ENTERTAINMENT DISTRIBUTION SYSTEM

Filed Aug. 20, 1962 3 Sheets-Sheet 3

INVENTOR.
FROST L. TINKLEPAUGH
BY
Carl Miller
ATTORNEY

United States Patent Office 3,303,279

Patented Feb. 7, 1967

3,303,279

PREPAID ENTERTAINMENT DISTRIBUTION SYSTEM

Frost L. Tinklepaugh, 93 Woodbury Road, Box 619, Huntington, N.Y. 11743

Filed Aug. 20, 1962, Ser. No. 217,904
7 Claims. (Cl. 178—5.8)

My invention is directed toward prepaid entertainment distribution systems for distributing aural and visual entertainment to a plurality of remotely situated receiving and reproducing stations, prepayment being accomplished by coin collecting apparatus at each station.

It is an object of my invention to provide new and improved prepaid entertainment distribution systems of the character indicated.

Another object of my invention is to provide a system of the character indicated adapted to distribute television programs.

Still another object of my invention is to provide a system of the character indicated wherein television programs are distributed and wherein the prepayment actuates the normally deactuated audio portion of the programs.

All of the foregoing and still further objects and advantages of my invention will either be explained or will become apparent hereinafter when this specification is studied in conjunction with the accompanying drawings wherein.

Figure 1:
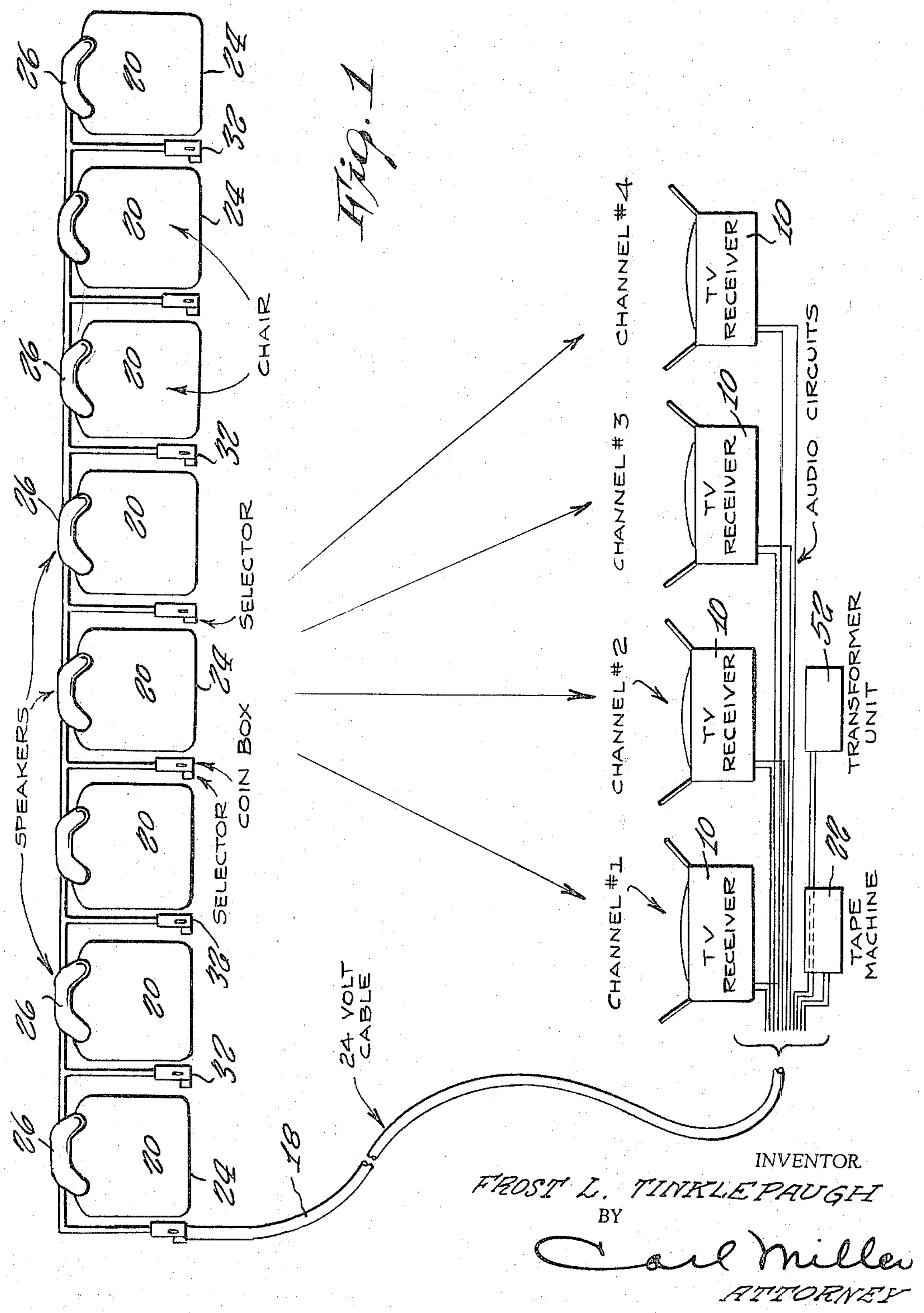
FIGURE 1 is a plan view of my invention.
Figure 2:
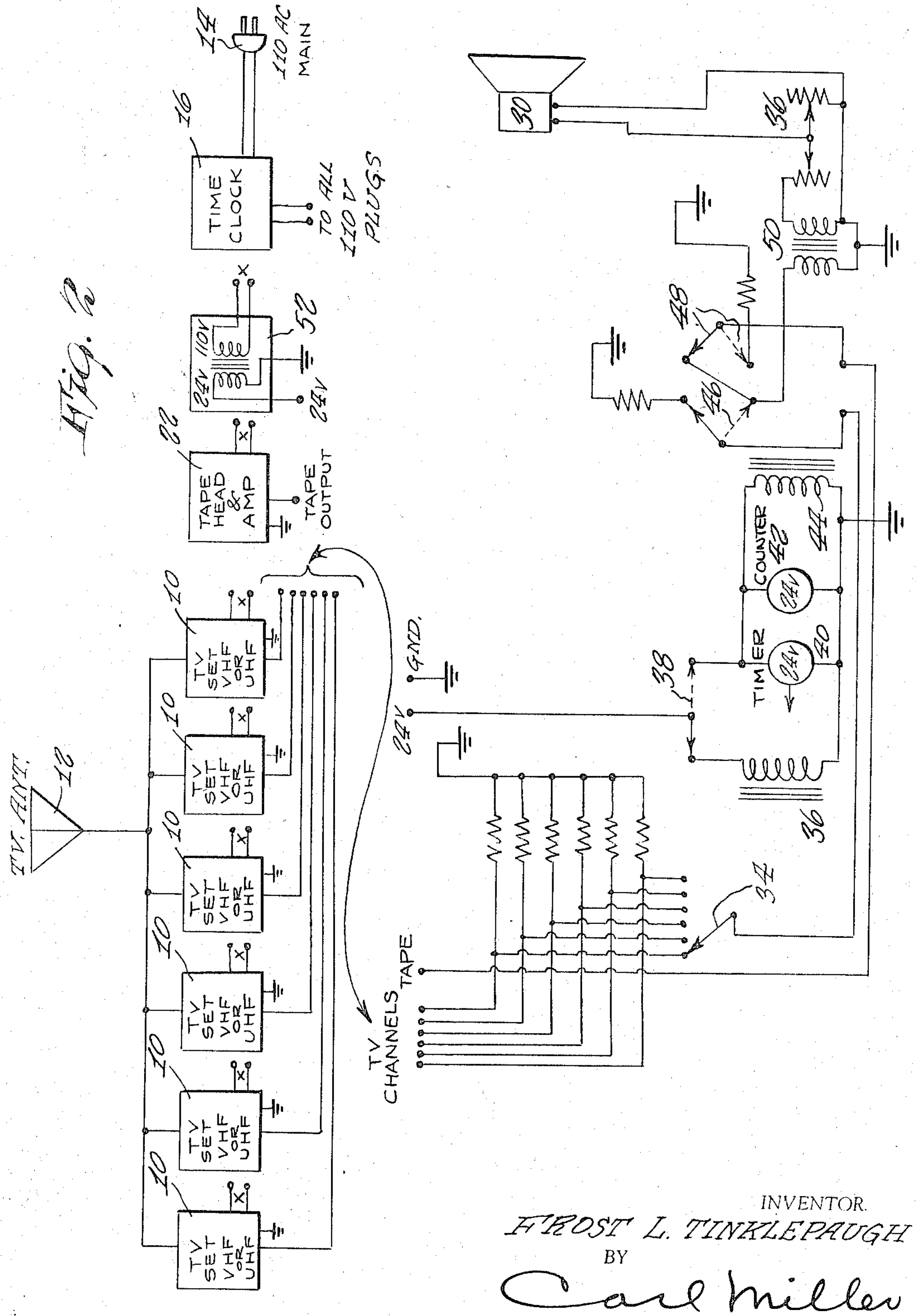
FIGURE 2 is an electrical circuit thereof.
Figures 3, 4, 5, 6, 7, 8:
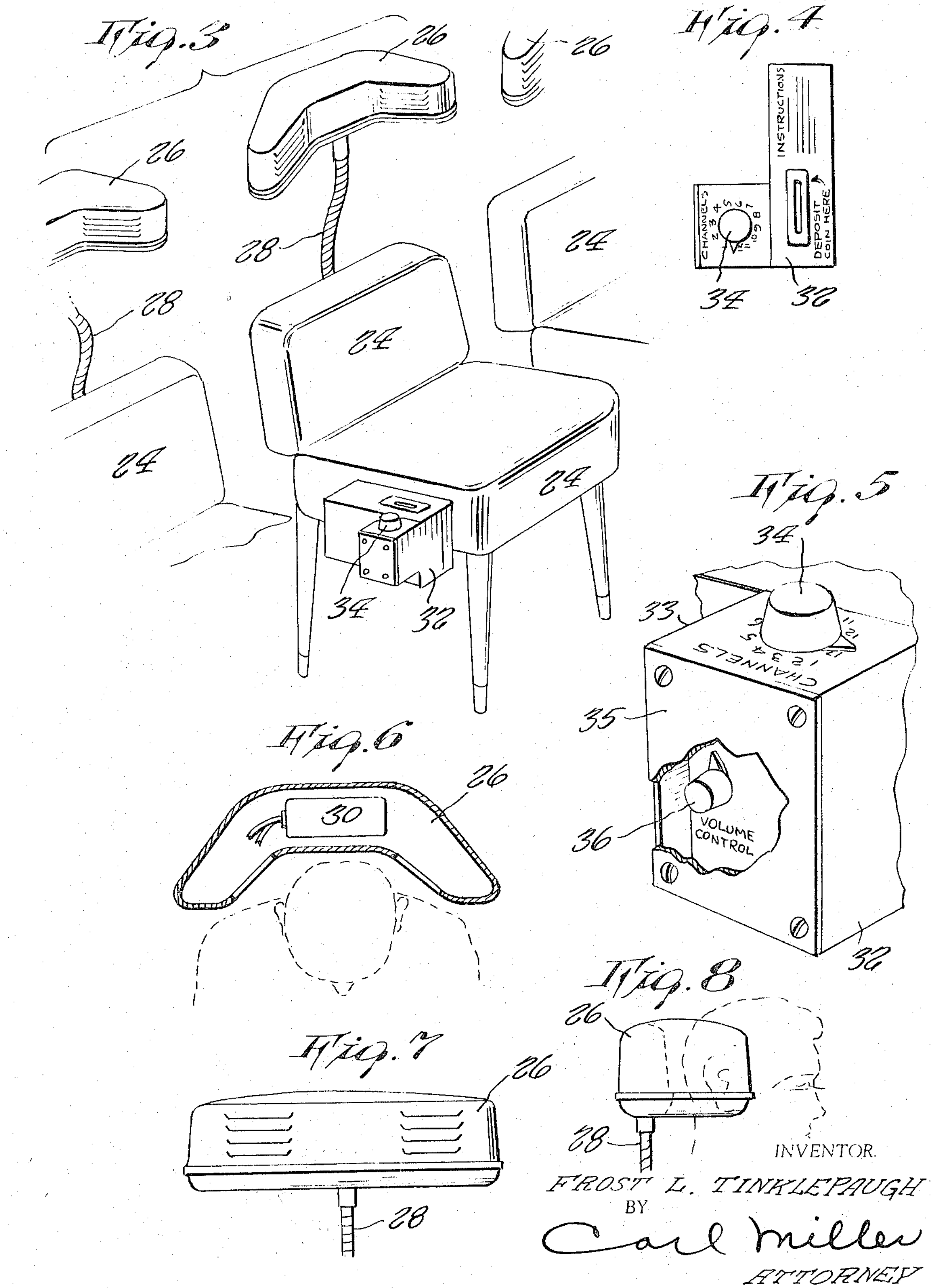
FIGURE 3 is a fragmentary perspective view of my invention.
FIGURE 4 is a plan of a control panel used in my invention.
FIGURE 5 is a detail of the panel of FIGURE 4.
FIGURE 6 is a plan cross sectional view of an audio unit as used in my invention.
FIGURE 7 is a front view of the unit of FIGURE 6.
FIGURE 8 is a side view of the unit of FIGURE 6.

Referring now to the drawings, a plurality of television receiving sets 10 are arranged side by side facing the same direction. These sets are all operative being connected to a common antenna 12, and are each tuned to a different television channel. The video portion of each channel is always displayed on the appropriate set as long as the 110 volt alternating power is supplied from a main through plug 14 and timer clock 16 by way of electrical leads X. (The clock 16 is set for a time period of operation as for example 16 hours. When this period is up, all power is cut off, to be restored by setting the clock.)

The sound or audio portion of the channel displayed on a particular set is not supplied to a loudspeaker within the set but rather is fed along a cable 18 (together with the audio portion from each of the other sets) to a plurality of chair stations 20, all audio leads being connected in parallel at each station.

In addition, the audio signal from a tape recorder mechanism 22 is also supplied along cable 18 to all stations.

Each station has a chair 24 having a head rest 26 attached to the chair by one or more flexible supports 28. Each head rest contains one or more loud speakers 30. Each station contains a coin operated mechanism 32 containing a channel selector switch 34 and a volume control 36 (preset by the operator of the system and not controlled by the viewer).

When a viewer drops the requisite amount of money in coins into the mechanism, by turning switch 34 to the appropriate position, he is able to hear in his head set the audio portion of the channel he has selected. The coins falling through the slot energize relay 36 which then connects contact arm 38 to the dotted position, actuating timer 40 and coin counter 42. In addition relay 44 is energized, connecting arms 46 and 48 to the dotted position, permitting the appropriate audio signal selected by switch 34 to pass through transformer 50 and the L pad volume control 36 to the appropriate speaker 30.

Improper amounts of money of counterfeit coins are rejected by relay 36; under these circumstances, contact arms 38, 46 and 48 are in the solid position and no audio signals from the television sets will be reproduced in the speaker 30. Instead, a recorded announcement or instruction, continuously being reproduced by tape recorder 22, is reproduced in the speaker. (Note that this recorded announcement is heard anytime that the station is not in use by a listener.)

The counters 42, timers 40 and relays 36 and 44 are operated by 24 volts and hence this power must be taken from the 110 volt portion of the circuit by way of transformer 52.

It will be further noted that the individual audio volume control 36 is housed in an enclosed casing 33, which is provided with a removal plate 35, so that the volume can only be adjusted or controlled by the authorized attendant or proprietor; who would normally have access to said volume control 36. Of course, the audio volume control 36 will be set just loud enough for only the paid viewer to hear the audio.

While I have described my invention with particular reference to the drawings, I desire that my protection not be limited thereto but be limited only by the terms of the claims which follow.

Having thus described my invention what I claim is new and desire to secure by Letters Patent is:

1. A prepaid entertainment distribution system comprising a plurality of television receivers arranged side by side, each receiver having a cathode ray tube, and adapted to display a video portion of a different television channel, all of said tubes extending in the same direction, the images produced by said tubes, being displayed side by side; means to conduct the audio portions of each of said channels from the appropriate receiver to a remote location; and a plurality of sound receiving stations which when energized, will receive selectively any one of said audio portions.

2. A system as set forth in claim 1, wherein said plurality is equal to at least three.

3. A system as set forth in claim 2, wherein each station is provided with coin collecting apparatus which when coins are collected energizes the station for a selected time period.

4. A system as set forth in claim 3, wherein each station is provided with a chair and a head rest secured to the top of said chair.

5. A system as set forth in claim 4, wherein each head rest contains a loud speaker.

6. A system as set forth in claim 5, wherein each station includes a switch which when the station is energized can select any one of the audio portions for reproduction in the speaker of this station.

7. A system as set forth in claim 6 wherein each station is provided with a volume control contained in an enclosed box with a removable plate.

References Cited by the Examiner

UNITED STATES PATENTS

| | | | |
|---|---|---|---|
| 2,663,850 | 12/1953 | Mellinger | 179—1 |
| 2,832,821 | 4/1958 | Du Mont | 178—6.5 |
| 2,892,889 | 6/1959 | Jones | 179—1 |

DAVID G. REDINBAUGH, *Primary Examiner.*

R. M. HESSIN, H. W. BRITTON, *Assistant Examiners.*